United States Patent
Ke

(10) Patent No.: US 11,644,889 B2
(45) Date of Patent: May 9, 2023

(54) POWER SUPPLY CUT-OFF IN STANDBY MODE

(71) Applicant: Hewlett-Packard Development Company, L.P., Spring, TX (US)

(72) Inventor: Hsiang Ta Ke, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/297,626

(22) PCT Filed: Sep. 13, 2019

(86) PCT No.: PCT/US2019/050943
§ 371 (c)(1),
(2) Date: May 27, 2021

(87) PCT Pub. No.: WO2021/050079
PCT Pub. Date: Mar. 18, 2021

(65) Prior Publication Data
US 2022/0350395 A1      Nov. 3, 2022

(51) Int. Cl.
*G06F 1/32* (2019.01)
*G06F 1/3296* (2019.01)
*G06F 1/3212* (2019.01)

(52) U.S. Cl.
CPC .......... *G06F 1/3296* (2013.01); *G06F 1/3212* (2013.01)

(58) Field of Classification Search
CPC ................ G06F 1/32; G06F 9/44; G06F 1/12
See application file for complete search history.

(56) References Cited

U.S. PATENT DOCUMENTS

| | | | |
|---|---|---|---|
| 5,842,027 A | 11/1998 | Oprescu et al. | |
| 6,653,813 B2 | 11/2003 | Khatri | |
| 6,820,206 B1 | 11/2004 | Kim et al. | |
| 7,877,618 B2 | 1/2011 | Lewis et al. | |
| 8,756,445 B2 | 6/2014 | Walsh et al. | |
| 9,015,512 B2 | 4/2015 | Golembeski, Jr. | |
| 9,830,670 B2 | 11/2017 | Fadell | |
| 2013/0040662 A1* | 2/2013 | Elisco ................ | G06Q 30/0241 455/566 |

(Continued)

FOREIGN PATENT DOCUMENTS

| WO | 2012/173843 A2 | 12/2012 |
|---|---|---|
| WO | 2015/042329 A1 | 3/2015 |

*Primary Examiner* — Keshab R Pandey
(74) *Attorney, Agent, or Firm* — Knobbe, Martens, Olson & Bear, LLP

(57) ABSTRACT

Examples of computing devices for cutting-off power supply of an electronic device in a standby mode are described herein. In an example, a computing device may include a battery and an embedded controller. The embedded controller may determine a charge stored in the battery at a time interval when the computing device is in a standby mode. Upon determining that the charge stored in the battery is below by a threshold value, the embedded controller may retrieve activity data from a memory of the computing device. The activity data may include a list of electronic devices that draw power from the battery of the computing device. The embedded controller may cut-off power supply of an active electronic device from the list of electronic devices.

15 Claims, 5 Drawing Sheets

(56) References Cited

U.S. PATENT DOCUMENTS

| | | |
|---|---|---|
| 2013/0300343 A1 | 11/2013 | Files et al. |
| 2014/0089701 A1* | 3/2014 | Kato .................... G06F 1/3287 |
| | | 713/323 |
| 2014/0181876 A1* | 6/2014 | Landow ............. H04N 21/4432 |
| | | 348/731 |
| 2016/0099584 A1 | 4/2016 | Park et al. |

* cited by examiner

POWER SUPPLY CUT-OFF IN STANDBY MODE

BACKGROUND

Computing devices, such as personal computers, laptops, notebooks, etc., transition to a standby mode when a computing device is idle for some time.

BRIEF DESCRIPTION OF FIGURES

The detailed description is provided with reference to the accompanying figures, wherein.

DETAILED DESCRIPTION

Figure 1:
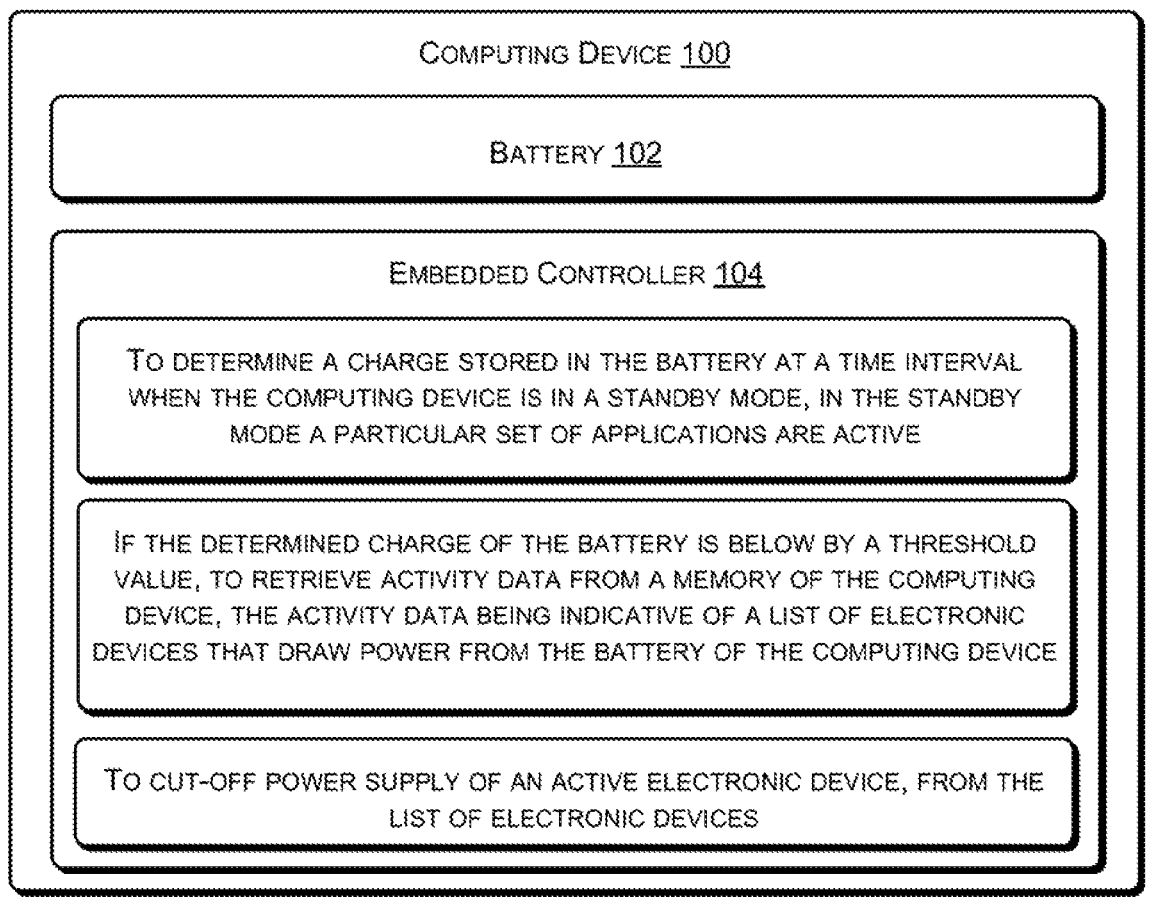
FIG. 1 illustrates a computing device for cutting-off power supply of an electronic device in a standby mode, according to an example.

A computing device, such as a notebook, a laptop, etc., may be connected with various electronic devices, such as a Universal Serial Bus (USB) enabled devices. In an example, the computing device may be provided with a dedicated port for exchanging data between the computing device and an electronic device that may be coupled to the computing device via the dedicated port. In addition to data exchange, the electronic device may draw power from a power source, such as an in-built battery, of the computing device.

When the computing device is idle or inactive for some time, the computing device may transit to a standby mode. In the standby mode, the computing device may enter a very-low power idle state while allowing certain background activity. In the standby mode, some electronic devices, coupled to the computing device, may also be active and may be running applications in the background. Such active electronic devices may consume relatively more power from the battery of the computing device as compared to a non-active electronic device.

As the computing device may be coupled to multiple electronic devices, determination of a specific electronic device that may be drawing relatively more power from the battery of the computing device may be challenging. To determine the power drawn by each electronic device, while the computing device is in the standby mode, individual monitoring circuits may be provided corresponding to each electronic device coupled to the computing device. The monitoring circuits may monitor the power drained from the battery of the computing device by each of the electronic devices. As the computing devices are becoming compact, addition of monitoring circuits for each electronic device may acquire space and may further add to the cost of the computing device.

The present subject matter discloses example approaches for conserving battery power of a computing device in a standby mode. For example, power supply of an active electronic device may be cut-off, when the computing device is in the standby mode and is powered by the in-built battery of the computing device without employing additional hardware.

The present subject matter describes example computing devices for managing stored power of a battery of the computing device, when the computing device is in the standby mode. As per the present subject matter, in the standby mode of the computing device, an existing embedded controller of the computing device may determine a charge stored in the battery of the computing device at a fixed time interval. Further, the embedded controller may check whether the determined charge has gone below by a threshold value in the fixed time interval. If the determined charge does not go below by the threshold value, the embedded controller may continue to monitor the charge stored in the battery at the fixed time interval.

In case, the determined charge falls by the threshold value, the embedded controller may obtain a list of electronic devices that draw power from the battery of the computing device. From the list of electronic devices, the embedded controller may select an active electronic device which may be performing an activity in the background and thus drawing power from the battery of the computing device. The embedded controller may cut-off power supply, of the active electronic device, from the battery.

Accordingly, the present subject matter facilitates in enhancing battery life of the computing device in a cost-efficient manner. Further, the present subject matter manages the stored power of the battery of the computing device, when the computing device is in standby mode, without employing additional hardware.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

The manner in which the computing devices are implemented are explained in detail with respect to FIGS. 1-5. While aspects of described computing devices can be implemented in any number of different electronic devices, environments, and/or implementations, the examples are described in the context of the following system(s). It is to be noted that drawings of the present subject matter shown here are for illustrative purposes and are not drawn to scale.

FIG. 1 illustrates a computing device 100 for cutting-off power supply of an electronic device (not shown) in a standby mode, according to an example. The electronic device may be a Universal Serial Bus (USB) enabled device which may be internal to the computing device 100 or may be external to the computing device 100. The USB enabled device may include a USB transceiver device that may be used at the computing device 100 or peripheral, a USB Hub or Host Controller integrated Circuit (IC) device, or a USB peripheral device. Examples of the computing device 100 may include, but are not limited to, a laptop, a notebook computer, and a tablet. The computing device 100 may include a battery 102 that may be capable of powering the computing device 100, Examples of the battery 102 may include, but are not limited to, a Nickel-Cadmium battery, Nickel Metal Hydride, or a Lithium Ion battery. In an example, the battery 102 may be a single battery or multiple batteries. In an example, the battery 102 may be a smart battery.

The computing device 100 may also include an embedded controller 104 that may be coupled to the battery 102 of the computing device 100. The embedded controller 104 may be a microcontroller that may handle various tasks of the computing device 100 which are not handled by an operating system of the computing device 100. In an example, the embedded controller 104 may determine a charge stored in the battery 102 at a time interval. For example, the embedded controller 104 may monitor remaining battery capacity of the computing device 100, when the computing device 100 is in the standby mode. The remaining battery capacity of the computing device 100 may be determined at a regular time interval, such as at a time interval of about 15 minutes. In the standby mode, although the computing device 100 may be in a low power idle state, a particular set of applications may remain active in a background of the computing device 100. For example, the applications may include any maintenance activity of an operating system of the computing device 100.

If the determined charge stored in the battery 102 is below by a threshold value, the embedded controller 104 may retrieve activity data from a memory (not shown) of the computing device 100. For example, if the embedded controller 104 may determine that the charge stored in the battery 102 may have gone below by about 10% in about 15 minutes, the embedded controller 104 may retrieve the activity data. In an example, the activity data may be indicative of a list of electronic devices that draw power from the battery 102 of the computing device 100. In another example, the activity data may be indicative of a list of electronic devices that exhibit unexpected behaviour with respect to the power drawn from the battery 102 of the computing device 100.

Further, the embedded controller 104 may cut-off power supply of an active electronic device (not shown) from the list of electronic devices. For example, the embedded controller 104 may retrieve the activity data having the list of electronic devices that draw power from the battery of the computing device 100. From the list of the electronic devices, the embedded controller 104 may identify an electronic device which is active in the standby mode, as the active electronic device. The embedded controller 104 may thereafter cut-off the power supply to the active electronic device. For example, the embedded controller 104 may communicate with a port of the computing device 100, to which the identified active electronic device is connected, to cut-off supply of power to the identified active electronic device. In an example, the embedded controller 104 may also determine if an activity of the active electronic device may maintain the computing device 100 in the standby mode, prior to cutting off the power supply.

The computing device 100 thus facilitates in efficiently managing the power that may be drawn, from the battery 102, by various electronic devices when the computing device 100 is in the standby mode. Although the cutting-off of power supply of the identified active electronic device is explained with respect to the embedded controller 104, the power supply of the active electronic device may be cut-off by any other controller or microprocessor of the computing device 100, which is separate from a processor (not shown) of the computing device 100.

Figure 2:
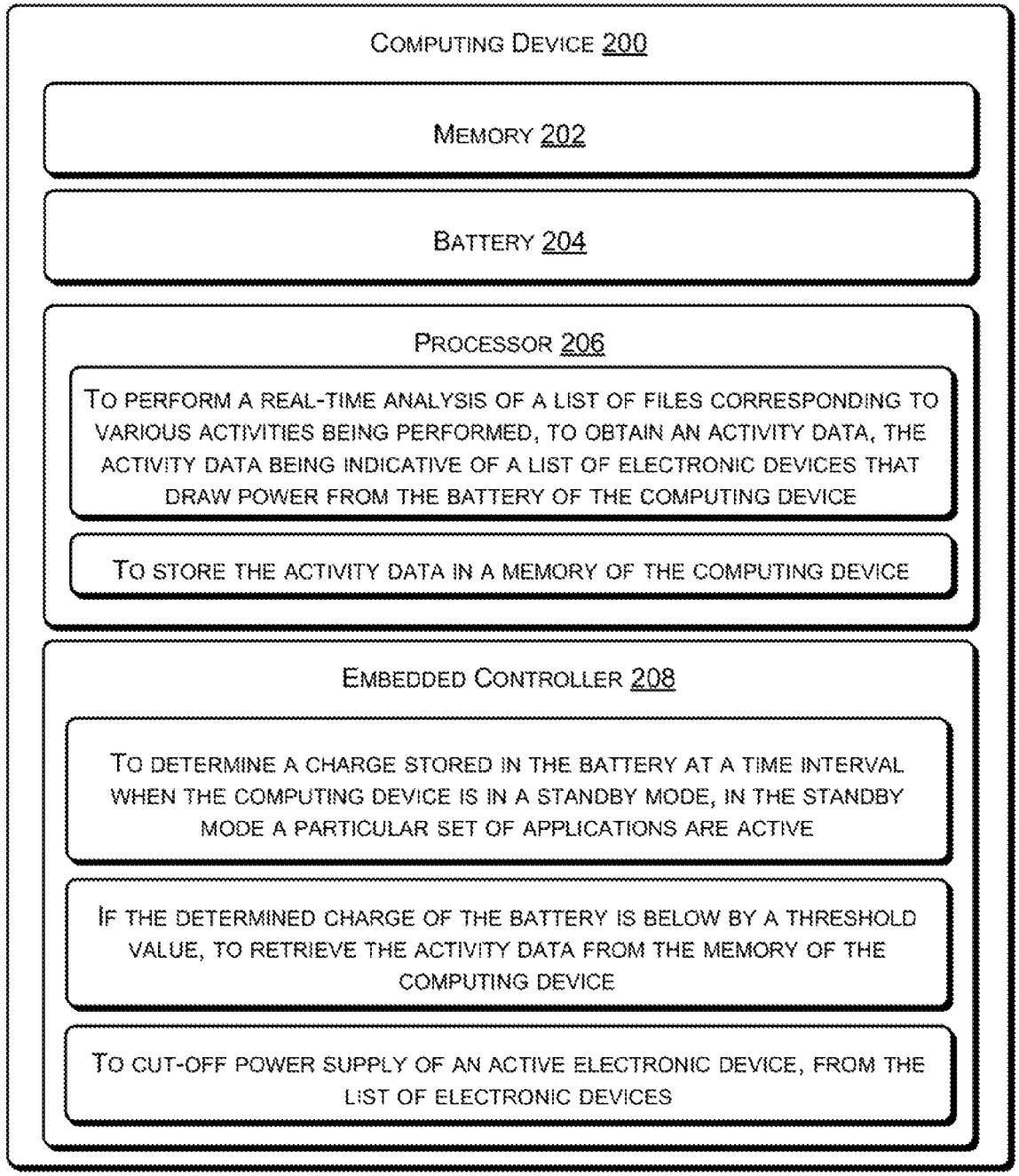
FIG. 2 illustrates a computing device for cutting-off power supply of an electronic device in a standby mode, according to an example.

FIG. 2 illustrates a computing device 200 for cutting-off power supply of an electronic device (not shown) in a standby mode, according to an example. For example, the electronic device may be Universal Serial Bus (USB) enabled device which may provide capability as a Printer, Scanner, Modem or other peripherals. In an example, the computing device 200 may be similar to the computing device 100. Further, the computing device 200 may include a memory 202. The memory 202, can include any non-transitory computer-readable medium known in the art including, for example, volatile memory, such as static random-access memory (SRAM) and dynamic random-access memory (DRAM). In an example, the memory 202 may be a shared memory, such that the memory 202 may be simultaneously accessible by multiple applications.

The computing device 200 may also include a battery 204 that may be coupled to the memory 202. In an example, the battery 102 may be a smart battery. The smart battery may measure voltage and current and deduce charge level or any other parameters that may indicate a state of health of the battery. The battery 204 may be similar to the battery 102. Further, the computing device 200 may include a processor 206 that may be coupled to the memory 202 and the battery 204 of the computing device 200. The processor 206 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

The processor 206 may perform a real-time analysis of a list of files corresponding to various activities being performed in the computing device 100. In an example, the list of files corresponding to various activities may be event trace logs that may be generated by the operating system executing on the computing device 200. The event trace logs may be generated for every application or program that may be running on the computing device 200. The event trace logs may include information pertaining to execution speed, battery consumption, input/output faults, and so on. For example, the processor 206 may perform the real-time analysis of the list of files, when the computing device 100 is in an active mode. In the active mode, the processor 206 may be operating.

Based on the real-time analysis, the processor 206 may identify a list of electronic devices that may draw power from the computing device 200. In an example, the processor 206 may identify a list of electronic devices that exhibit unexpected behaviour with respect to the power drawn from the battery 204 of the computing device 200. The processor 206 may store the list of electronic devices as activity data in the memory 202 of the computing device 200. As mentioned earlier, the memory 202 may be a shared memory that may be simultaneously accessible by multiple applications.

Further, the computing device 200 may include an embedded controller 208 that may be coupled to the memory 202, the battery 204, and the processor 206, of the computing device 200. In an example, when the computing device 200 may transition into the standby mode, the embedded controller 208 may determine a charge stored in the battery 204 at a time interval. For example, the embedded controller 208 may monitor remaining battery capacity of the computing device 200 at a time interval of about 10 minutes, when the computing device 200 is in the standby mode. In the standby mode, a particular set of applications may be active on the computing device 200.

If the determined charge stored in the battery 204 is below by a threshold value, the embedded controller 208 may retrieve the activity data from the memory 202 of the computing device 200. For example, if the embedded controller 208 may determine that the charge stored in the battery 204 may have gone below by about 10% in about 10 minutes, the embedded controller 208 may obtain the activity data as stored by the processor 206.

Further, based on the activity data, the embedded controller 208 may cut-off power supply of an active electronic device (not shown) that may be identified from the list of electronic devices. For example, the embedded controller 208 may select an electronic device which is active in the standby mode, as the active electronic device. The embedded controller 208 may thereafter cut-off the power supply to the active electronic device. For example, the embedded controller 208 may cut-off power supply of a port to which the active electronic device may be connected. In an example, the embedded controller 208 may communicate with the battery 204 through smart battery protocols, such as read word, read block, write word, and write block protocols.

Figure 3:
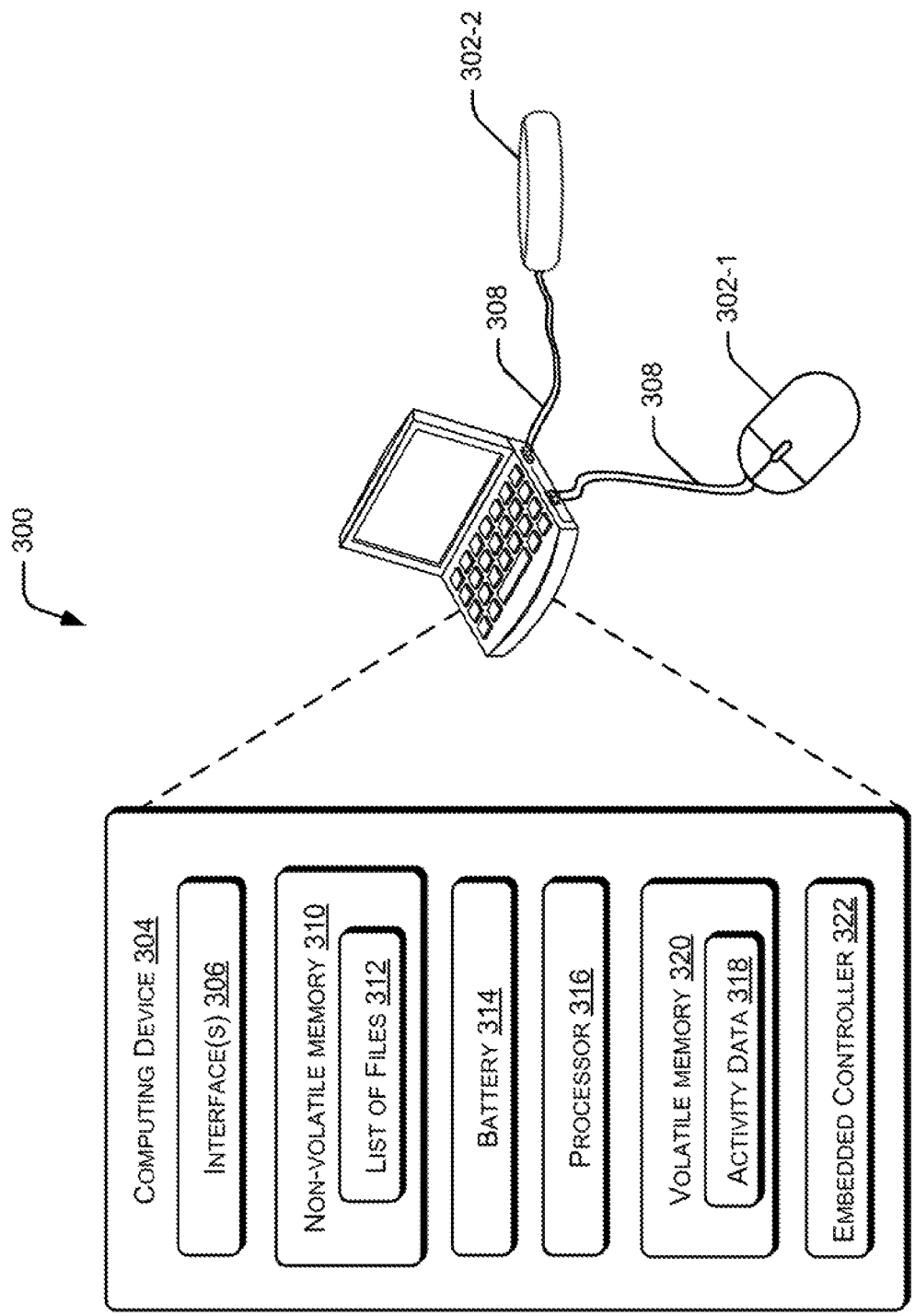
FIG. 3 illustrates a computing device for cutting-off power supply of an electronic device in a standby mode, according to an example.

FIG. 3 illustrates a system environment 300 for cutting-off power supply of an electronic device 302 in a standby mode, according to an example. The electronic device 302 may be coupled to a computing device 304. Examples of the electronic device 302 may include, Universal Serial Bus (USB) enabled devices which may be internal to the computing device 304 or may be external to the computing device 304. For example, the electronic device 302 may be a USB mouse 302-1, a portable speaker 302-2, and so on. Further, examples of the computing device 304 may include, but are not limited to, a laptop computer, a notebook computer, and a tablet.

The electronic devices 302 coupled to the computing device 304 may be power delivery (PD) enabled or non-PD enabled. The PD enabled electronic devices may perform a handshake with the computing device 304 to negotiate optimized power consumption by the electronic device. Non-PD enabled electronic devices, on the other hand, do not negotiate optimized power consumption with the computing device 304.

In an example, the electronic devices 302 may be coupled to the computing device 304 by means of interface(s) 306. The interface(s) 306 may include a variety of interfaces, for example, interface(s) 306 for electronic devices 302. In an example, the interface(s) 306 may include a Universal Serial Bus (USB) and FireWire interfaces that may be used to connect electronic devices 302 to the computing device 304. The interface(s) 306 may include data output devices. The interface(s) 306 facilitate the communication of the computing device 304 with various communication and electronic devices. In an example, the electronic devices 302 may be coupled to the computing device 304 through a USB cable 308.

Further, the computing device 304 may include a non-volatile memory 310, such as read only memory (ROM), erasable programmable ROM, flash memories, hard disks, optical disks, and magnetic tapes. The non-volatile memory 310 may store an operating system for being executed on the computing device 304 when the computing device 304 is in an active mode. In an example, the operating system may generate a list of files 312, such as event trace logs of all activities that may be performed on the computing device 304, when the computing device 304 is in the active mode. The list of files 312 may contain a snapshot of events related to a state information of the computing device 304 at a particular time or may contain events related to the state information over time. For example, events related to the state information may include power consumption by each activity being performed on the computing device 304, time taken by each activity, processing speed of each activity, and so on.

In one example, the computing device 304 includes a battery 314 that may be capable of powering the computing device 304. The battery 314 may be similar to the battery 102. Further, the computing device 304 includes a processor 316. The processor 316 may be similar to the processor 206. In an example, the processor 316 may be able to access the list of files 312 from the non-volatile memory 310, as long as the computing device 304 is in the active mode. When the computing device 304 transitions or enters the standby mode, the processor 316 may become inactive and the list of files 312 may become inaccessible in the standby mode.

Accordingly, the processor 316 may analyse the list of files 312, while the computing device is active, to identify a list of electronic devices that may be drawing power from the battery 314 of the computing device 304. For example, the processor 316 may cause a system service to run in background to identify a list of electronic devices that may be exhibiting unusual power consumption behaviour, based on the analysis of the list of files 312. The processor 316 may store the list of identified electronic devices as activity data 318 in a volatile memory 320 of the computing device 304. In an example, the activity data 318 may also include identifiers of the electronic devices, information pertaining to ports to which each of the identified electronic devices are connected, and power consumption information for each of the identified electronic devices.

In an example, the volatile memory 320 may be separate from the non-volatile memory 310. The volatile memory 320, communicatively coupled to the processor 316, can include any non-transitory computer-readable medium known in the art including, such as static random-access memory (SRAM) and dynamic random-access memory (DRAM). In an example, the volatile memory 320 may be a shared memory, such that the volatile memory 320 may be simultaneously accessible by multiple applications.

The computing device 304 may also include an embedded controller 322. The embedded controller 322 may include a controller or microprocessor of the computing device 304, which is separate from the processor 316. The embedded controller 322 may manage the power drawn form the battery 314, when the computing device 304 is in standby mode.

In an example, in standby mode of the computing device 304, the embedded controller 322 may determine a charge stored in the battery 314 at a regular time interval. For example, the embedded controller 322 may communicate with the battery 314 to determine a battery capacity of the computing device 304 at a first time instance (T1) and a second time instance (T2), such that the T1 and T2 are separated by 15 minutes. The embedded controller 322 may request information pertaining to a cell pack voltage and current being supplied through terminals of the battery 314, from the battery 314. Based on the requested information, a terminal voltage of the battery 314 and a charging/discharging rate of the battery 314 may be evaluated and the embedded controller 322 may determine the battery capacity. In an example, the battery 314 may be a smart battery which may measure voltage and current and deduce the charge stored in the battery 314. The battery 314 may share information pertaining to the charge stored in the battery 314 with the embedded controller 322, upon being requested by the embedded controller 322.

If the determined charge stored in the battery 314 goes below by a threshold value, the embedded controller 322 may retrieve the activity data 318 from the volatile memory 320 of the computing device 304. For example, if the charge stored in the battery 314 drops by about 10% in about 15 minutes, the embedded controller 104 may retrieve the activity data 318. As the volatile memory 320 is shared storage, the embedded controller 322 may access the volatile memory 320 to retrieve the activity data 318, even when the computing device 304 may be in the standby mode.

For each of the identified electronic devices, the embedded controller 322 may check if the identified electronic device is active in standby mode or not. For example, if the identified electronic device is the USB mouse 302-1, the embedded controller 322 may check if the USB mouse 302-1 is active in the standby mode. Upon determination that the USB mouse 302-1 is active, the embedded controller 322 may check if activity of the active electronic device may maintain the computing device 304 in the standby mode or not. For example, the embedded controller 322 may check if the USB mouse 302-1 is capable of waking up the computing device 304 from the standby state or not. As the USB mouse 302-1 is a waking up device, the embedded controller 322 may not disconnect power supply to the USB mouse 302-1. In case the identified electronic device is the portable speaker 302-2, the embedded controller 322 may check that the portable speaker 302-2 is active in standby mode and is a non-waking up device. Accordingly, the embedded controller 322 may cut-off power supply of the portable speaker 302-2.

As soon as the computing device 304 becomes active again or transitions from the standby state to the active state, the embedded controller 322 may automatically restore the power supply to the portable speaker 302-2.

Figure 4:
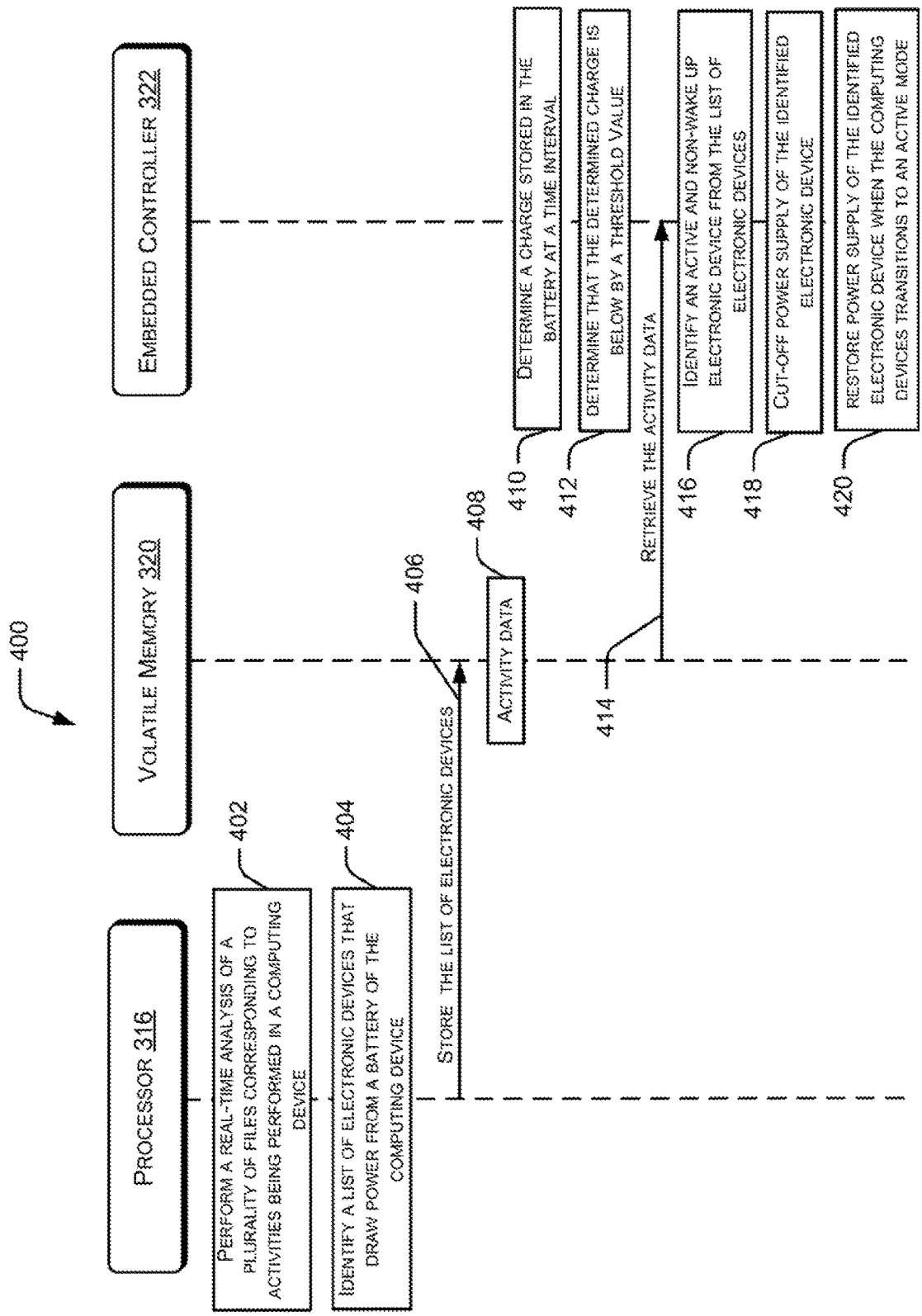
FIG. 4 illustrates a call flow diagram for cutting-off power supply of an electronic device in a standby mode, according to an example.

FIG. 4 illustrates a call flow diagram 400 for cutting-off power supply of an electronic device in a standby mode, according to an example of the present subject matter. The various arrow indicators used in the call flow diagram 400 depicts the transfer of data between the various entities in the system environment 300, and between the computing device 304 and the electronic devices 302. The order in which the call flow diagram 400 is described is not intended to be construed as a limitation, and any number of the described steps may be combined in any order to implement the call flow diagram 400, or an alternative method. Further, certain trivial steps have been omitted in the sequence diagrams, for the sake of brevity and clarity.

Referring to FIG. 4, at step 402, the processor 316 may perform a real-time analysis of a plurality of files corresponding to various activities being performed in a computing device, such as the computing device 304. In an example, the processor 316 may perform the real-time analysis of the plurality of files when the computing device 304 is in an active mode. For example, in the active mode, the computing device 304 is in a working state.

At step 404, the processor 316 may identify a list of electronic devices that draw power from battery, such as the battery 314 of the computing device 304. In an example, the processor 316 may identify the list of electronic devices based on the power drawn in the active mode of the computing device 304. The processor 316 may store the list of electronic devices in the volatile memory 320 of the computing device 304, as shown in step 406.

At step 408, the volatile memory 320 may store the list of electronic devices along with identifiers of the electronic devices, information pertaining to ports to which each of the identified electronic devices are connected, and power consumption information for each of the identified electronic devices, as activity data.

When the computing device 304 transitions into standby mode, the embedded controller 322 may determine a charge stored in the battery 314 at a fixed time interval, such as after every 15 minutes, as shown in step 410. Further, at step 412, the embedded controller 322 may check if the determined charge is below by a threshold value of 5%. If the determined charge has fallen by the threshold value, the embedded controller 322 may retrieve the activity data from the volatile memory 320, as shown in step 414. On the other hand, if the determined charge has not fallen by the threshold value, the embedded controller 322 may not retrieve the activity data.

At step 416, the embedded controller 322 may identify those electronic devices from the list of electronic devices which are active in the standby mode and which does not wake-up the computing device 304 from the standby mode. Based on the determination, the embedded controller 322 may cut-off power supply to those identified electronic devices to enhance the battery life of the computing device 304 in the standby mode, as shown in step 418. Further, at step 420, the embedded controller 322 may automatically restore the power supply of the identified electronic device as soon as the computing device 304 may transition from the standby mode to the active mode.

Figure 5:
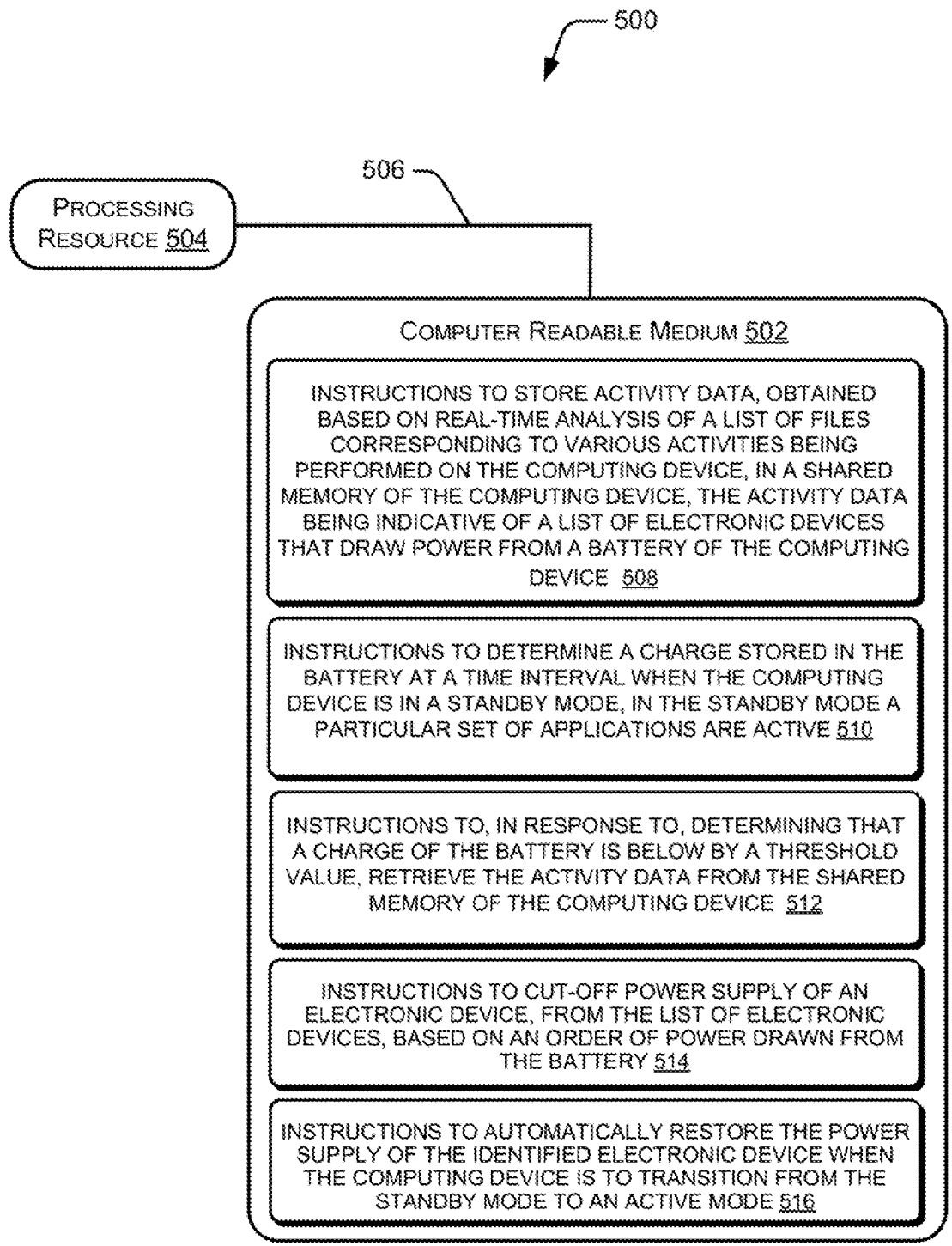
FIG. 5 illustrates a non-transitory computer readable medium for cutting-off power supply of an electronic device in a standby mode, according to an example.

FIG. 5 illustrates an example system environment 500 using a non-transitory computer-readable medium 502 for cutting-off power supply of an electronic device in a standby mode, according to an example of the present subject matter. The system environment 500 includes a processing resource 504 communicatively coupled to the non-transitory computer-readable medium 502 through a communication link 506. For example, the processing resource 504 may be a processor or an embedded controller of a computing system, such as the computing device, for fetching and executing computer-readable instructions from the non-transitory computer-readable medium 502.

The non-transitory computer-readable medium 502 may be, for example, an internal memory device or an external memory device. In one example, the communication link 506 may be a direct communication link, such as one formed through a memory read/write interface. In another example, the communication link 506 may be an indirect communication link, such as one formed through a network interface. In such a case, the processing resource 504 may access the non-transitory computer-readable medium 502 through a network (not shown).

In an example, the non-transitory computer-readable medium 502 includes a set of computer-readable and executable instructions for cutting-off power supply of an electronic device in a standby mode. The set of computer-readable instructions may include instructions as explained in conjunction with FIGS. 1 to 3. The set of computer-readable instructions, referred to as instructions hereinafter, may be accessed by the processing resource 504 through the communication link 506 and subsequently executed to perform acts for cutting-off power supply of an electronic device in a standby mode.

Referring to FIG. 5, in an example, the non-transitory computer-readable medium may include instructions 508 to store an activity data in a shared memory of the computing device. In an example, the shared memory may be a volatile memory, such as the Random-Access Memory (RAM) of the computing device, that may be accessible by multiple applications. Further, the activity data may be obtained based on a real-time analysis of a list of files corresponding to various activities being performed on the computing device. For example, a processor, such as the processor 206 and 316 may analyze event trace logs that may be generated by an operating system of the computing device. Based on the analysis, the processor may obtain a list of electronic devices that may draw power from the computing device. The processor may store the list of electronic devices in the shared memory as the activity data.

The non-transitory computer-readable medium 502 may also include instructions 510 to determine a charge stored in the battery of the computing device at a time interval. For example, the time interval may be in a range of about 5 minutes to about 15 minutes. Further, the charge stored in the battery of the computing device may be determined when the computing device is in a standby mode. For example, in the standby mode, a particular set of applications may be active on the computing device. The particular set of applications may include, such as a maintenance of the operating system, and so on, that may be running in a background of the computing device even when the computing device is in the standby mode.

The non-transitory computer-readable medium 502 may include instructions 512 to in response to determining that the charge of the battery is below by a threshold value, retrieve the activity data from the shared memory of the computing device. For example, if the charge of the battery may fall by about 5% to about 10% in a range of about 10 minutes to about 15 minutes, the embedded controller may retrieve the activity data that from the RAM of the computing device. As mentioned above, the activity data may include a list of electronic devices that draw power from the battery of the computing device.

The non-transitory computer-readable medium 502 may include instructions 514 to cut-off power supply of an electronic device, from the list of electronic devices, based on an order of power drawn from the battery of the computing device. For example, the embedded controller may provide instructions to the battery to cut-off the power supply of an electronic device that draws more power from the battery when compared to rest of the electronic devices in the list of electronic devices. In an example, the embedded controller may communicate with the battery through smart battery protocols, such as read word, read block, write word, and write block protocols.

In addition, the non-transitory computer-readable medium 502 may include instructions 516 to automatically restore the power supply of the identified electronic device when the computing device is to transition from the standby mode to an active mode. In the active mode, the computing device is completely usable and is in a working state.

Although aspects for the present disclosure have been described in a language specific to structural features and/or methods, it is to be understood that the appended claims are not limited to the specific features or methods described herein. Rather, the specific features and methods are disclosed as examples of the present disclosure.

We claim:

1. A computing device comprising:
   a battery; and
   an embedded controller, coupled to the battery, to,
      determine a charge stored in the battery at a time interval when the computing device is in a standby mode, wherein in the standby mode a particular set of applications are active;
      in response to determining that the charge stored in the battery is below by a threshold value, retrieve activity data from a memory of the computing device, the activity data being indicative of a list of electronic devices that draw power from the battery of the computing device; and
      cut-off power supply of an active electronic device, from the list of electronic devices.

2. The computing device as claimed in claim 1, wherein activity of the active electronic device is to maintain the computing device in the standby mode.

3. The computing device as claimed in claim 1, wherein the memory is a shared memory, the shared memory being indicative of a memory that is simultaneously accessible by multiple applications.

4. The computing device as claimed in claim 1, wherein the embedded controller is to restore the power supply of the active electronic device, when the computing device is to transition from the standby mode to an active mode.

5. The computing device as claimed in claim 1, wherein the time interval is in a range of about 10 minutes to about 15 minutes.

6. The computing device as claimed in claim 1, wherein the threshold value is in a range of about 5% to about 10%.

7. A computing device comprising:
   a memory;
   a battery coupled to the memory;
   a processor, coupled to the memory and the battery, to,
      perform a real-time analysis of a list of files corresponding to various activities being performed, to obtain activity data, the activity data being indicative of a list of electronic devices that draw power from the battery of the computing device; and
      store the activity data in the memory of the computing device; and
   an embedded controller, coupled to the memory, the battery, and the processor, to,
      determine a charge stored in the battery at a time interval when the computing device is in a standby mode, wherein in the standby mode a particular set of applications are active;
      in response to determining that the charge stored in the battery is below by a threshold value, retrieve the activity data from the memory of the computing device; and
      cut-off power supply of an active electronic device, from the list of electronic devices.

8. The computing device as claimed in claim 7, wherein the memory is a shared memory, the shared memory being indicative of a memory that is simultaneously accessible by multiple applications.

9. The computing device as claimed in claim 8, wherein the shared memory is a random-access memory (RAM).

10. The computing device as claimed in claim 7, wherein the threshold value is in a range of about 5% to about 10%.

11. The computing device as claimed in claim 7, wherein activity of the active electronic device is to maintain the computing device in the standby mode.

12. A non-transitory computer-readable medium comprising computer-readable instructions, which, when executed by a processor and an embedded controller, cause a computing device to:
   store activity data, obtained based on real-time analysis a list of files corresponding to various activities being performed on the computing device, in a shared memory of the computing device, the activity data being indicative of a list of electronic devices that draw power from a battery of the computing device;

determine a charge stored in the battery at a time interval when the computing device is in a standby mode, wherein in the standby mode a particular set of applications are active;

in response to determining that the charge stored in the battery is below by a threshold value, retrieve the activity data from the shared memory of the computing device;

cut-off power supply of an electronic device, from the list of electronic devices, based on an order of power drawn from the battery; and automatically restore the power supply of the electronic device, when the computing device is to transition from the standby mode to an active mode.

13. The non-transitory computer-readable medium as claimed in claim 12, wherein the threshold value is in a range of about 5% to about 10%.

14. The non-transitory computer-readable medium as claimed in claim 12, wherein the shared memory is a random-access memory (RAM).

15. The non-transitory computer-readable medium as claimed in claim 12, wherein the time interval is in a range of about 10 minutes to about 15 minutes.

\* \* \* \* \*